Patented Nov. 9, 1937

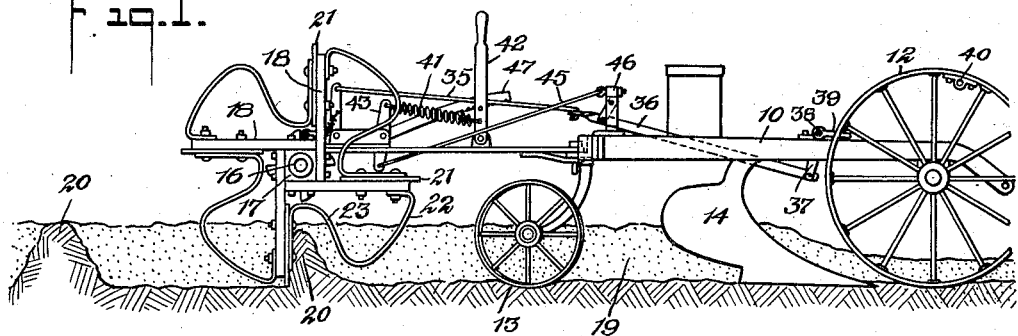
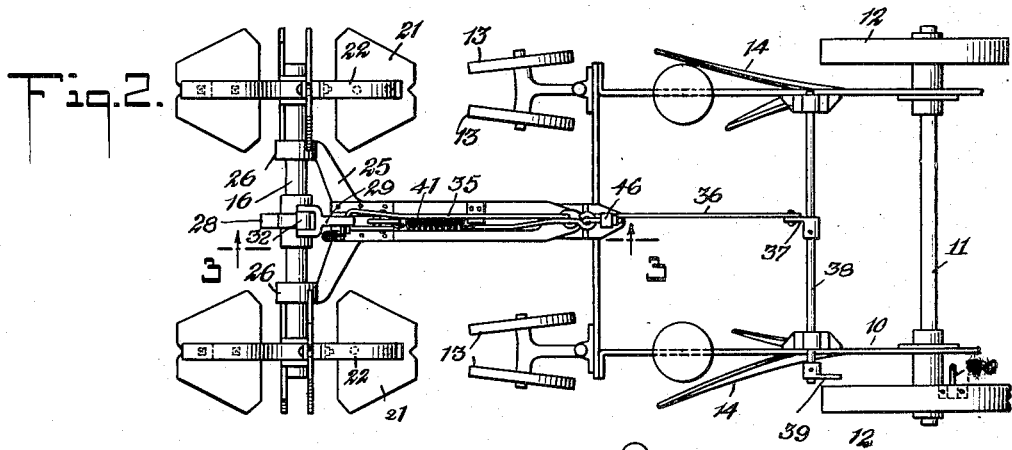
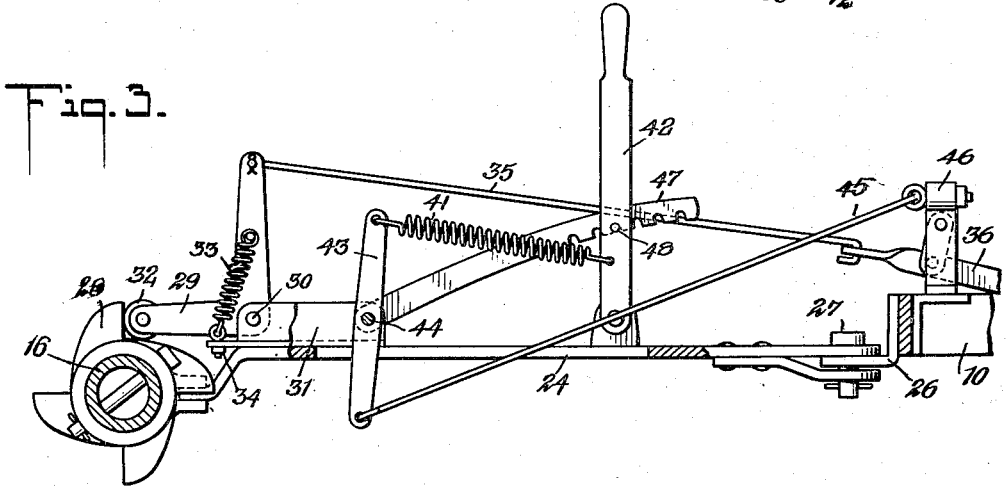

2,098,738

UNITED STATES PATENT OFFICE 2,098,738

ATTACHMENT FOR LISTER PLANTERS

George Campbell, Aurora, Nebr.

Application May 19, 1937, Serial No. 143,429

6 Claims. (Cl. 97—55)

This invention relates to attachments for lister planters, the object of the invention being to provide an attachment which may be connected to an ordinary lister planter and which will form dams in the furrows to hold rain and stop weather and wind erosion.

The invention embodies many novel features of construction and combinations and arrangements of parts, all of which will be more fully hereinafter described and pointed out in the claims.

In the accompanying drawing—

Figure 1 is a view in side elevation illustrating my attachment operatively connected to a lister planter;

Figure 2 is a plan view of Fig. 1;

Figure 3 is a fragmentary, sectional detail view on an enlarged scale on the line 3—3 of Fig. 2.

10 represents the frame of an ordinary lister planter which at its forward end is supported upon an axle 11, the latter being mounted in wheels 12. The rear of the frame 10 is supported by pairs of small wheels 13 which run in the furrows formed by the plows 14 of the lister.

My improved attachment includes a shaft 16 on the ends of which square blocks 17 are secured. Arms 18 are secured at their inner ends to the faces of the blocks 17 and scraper blades 21 are secured to the arms. These scraper blades are suitably shaped to move in the furrows 19 formed by the plows 14, and when in a vertical position in said furrows they operate to collect the earth in front of them so as to form dams 20 extending across the furrows. Located fixedly between adjacent arms, or arms and blades, I provide my improved carry-over irons 22, which may constitute strips of metal, and which at one end are given a somewhat concave curvature, as shown at 23, so as to permit the irons to move over the dams without injuring them, while the other portions of said irons are convexly curved so that they ride or roll in the bases of the furrows while the scraper assemblage is turning a distance of 90° as will more fully hereinafter appear.

24 represents a forwardly extending tongue which is provided at its rear end with a bracket 25 with bearings 26 thereon receiving the shaft 16. The forward end of this tongue 24 is adapted to be coupled to a bracket 26 at the rear of the lister frame 10, by means of a coupling pin 27. A four-toothed ratchet wheel 28 is fixedly secured to the central portion of shaft 16 and is held against forward turning movement by a dog 29. This dog is in the form of a bell crank lever pivotally supported at its angle, as shown at 30, in a bracket 31 on tongue 24. One arm of this bell crank lever constitutes a pawl having a roller 32 engaging the ratchet wheel 28, the other arm of this bell crank lever being connected by a coil spring 33 with an eye bolt 34 fixed to bracket 31 so that this spring serves to hold the dog in resilient engagement with the ratchet wheel. One of the arms of the bell crank lever is connected by a forwardly extending rod 35 with a rearwardly extending rod 36 on the lister planter. The forward end of this rod 36 is pivotally connected to a crank arm 37 on a crank shaft 38 having rotary mounting in the lister frame 10. On one end of this shaft 38 a crank arm 39 is secured and is located in the path of movement of a finger 40 on one of the lister wheels 12 so that upon each complete revolution of the wheel 12 the finger 40 will engage the crank arm 39 and through the medium of the mechanism above described will move the dog 29 to a position to release the scraper assemblage and allow the same to turn a distance of 90°.

To regulate the weight of the attachment and correspondingly regulate the amount of earth scraped into the dams, I provide a counterbalance spring 41 which is connected at its forward end to a hand operated lever 42, and at its rear end to the upper end of a lever 43, the latter being pivotally mounted between its ends, as shown at 44, on the bracket 31. The lower end of this lever 43 is connected by a rod 45 with a fixed member 46 on the lister frame 10. 47 represents a notched bar also mounted at its rear end on the pivot 44 and adapted to engage a pin 48 in any of its notches to hold the manually operated lever 42 in any position of adjustment.

The operation is as follows:

As the lister planter moves over the ground its plows 14 cut the furrows 19 and the seed or grain is dropped into the furrows back of the plows. The scraper blades 21 scrape the walls of the furrows so as to pile up the earth in front of them for a given distance to form the dams 20 and when the finger 40 on the wheel 12 engages the crank arm 39 the ratchet wheel 28 will be released and the scraper assemblage will turn a distance of 90°, and during this movement the irons 22 because of their shape will move or step over the dams without injuring them and will then roll in the bottom of the furrow to bring the next scraper blade in operative position and when in this position the dog 29 will hold the assemblages against movement until the next operation.

While I have illustrated and described what I believe to be a preferred embodiment of my invention, it is obvious that various changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. A device of the character described, including a shaft, a circular series of arms fixed to the shaft and located at an angle to each other, scraper blades fixed to the arms, and carry-over irons fixedly located between the blades, said irons having concave portions to straddle the dams built up by the blades and having convex portions to engage the ground.

2. A device of the character described, including a shaft, a circular series of arms fixed to the shaft and located at an angle to each other, scraper blades fixed to the arms, carry-over irons fixedly located between the blades, said irons having concave portions to straddle the dams built up by the blades and having convex portions to engage the ground, means normally holding the shaft against turning movement, and shaft releasing means permitting the shaft to turn a predetermined distance.

3. In combination with a lister planter, an attachment coupled to the rear of the lister and comprising a shaft, scraper assemblages at the ends of the shaft, each scraper assemblage including arms fixed to the shaft, scraper blades on the arms and carry-over irons between the scraper blades, said irons so shaped as to straddle dams built up by the scraper blades and to move on the bottom of the furrows when the scraper assemblages are turned, a ratchet wheel fixed to the central portion of the shaft, a spring held dog engaging the ratchet wheel and normally holding the wheel and shaft against turning movement, and means operated by the lister planter to release said ratchet wheel at predetermined intervals.

4. In combination with a lister planter, an attachment coupled to the rear of the lister and comprising a shaft, scraper assemblages at the ends of the shaft, each scraper assemblage including arms fixed to the shaft, scraper blades on the arms and carry-over irons between the scraper blades, said irons so shaped as to straddle dams built up by the scraper blades and to move on the bottom of the furrows when the scraper assemblages are turned, a ratchet wheel fixed to the central portion of the shaft, a spring held dog engaging the ratchet wheel and normally holding the wheel and shaft against turning movement, a crank shaft on the lister planter, a finger on one of the wheels of the lister planter adapted to engage an arm of said crank shaft at each revolution of the wheel, and means operatively connecting the crank shaft with said dog whereby the ratchet wheel is released at every revolution of the wheel of the lister planter.

5. In combination with a lister planter, an attachment coupled to the rear of the lister and comprising a shaft, scraper assemblages at the ends of the shaft, each scraper assemblage including arms fixed to the shaft, scraper blades on the arms and carry-over irons between the scraper blades, said irons so shaped as to straddle dams built up by the scraper blades and to move on the bottom of the furrows when the scraper assemblages are turned, a ratchet wheel fixed to the central portion of the shaft, a spring held dog engaging the ratchet wheel and normally holding the wheel and shaft against turning movement, a crank shaft on the lister planter, a finger on one of the wheels of the lister planter adapted to engage an arm of said crank shaft at each revolution of the wheel, means operatively connecting the crank shaft with said dog whereby the ratchet wheel is released at every revolution of the wheel of the lister planter, a tongue connected to the shaft and removably connected to the lister planter, a manually operated lever on the tongue, a second lever pivotally mounted between its ends on the tongue, a rod connecting one end of said last-mentioned lever with a fixed part on the lister planter, a counterbalance spring connecting the other end of said last-mentioned lever with the manually operated lever, and means for holding the manually operated lever in any position of adjustment.

6. In combination with a lister planter, an attachment coupled to the rear of the lister and comprising a shaft, scraper assemblages at the ends of the shaft, each scraper assemblage including arms fixed to the shaft, scraper blades on the arms and carry-over irons between the scraper blades, said irons so shaped as to straddle dams built up by the scraper blades and to move on the bottom of the furrows when the scraper assemblages are turned, a ratchet wheel fixed to the central portion of the shaft, a spring held dog engaging the ratchet wheel and normally holding the wheel and shaft against turning movement, a crank shaft on the lister planter, a finger on one of the wheels of the lister planter adapted to engage an arm of said crank shaft at each revolution of the wheel, means operatively connecting the crank shaft with said dog whereby the ratchet wheel is released at every revolution of the wheel of the lister planter, a tongue connected to the shaft and removably connected to the lister planter, a manually operated lever on the tongue, a second lever pivotally mounted between its ends on the tongue, a rod connecting one end of said last-mentioned lever with a fixed part on the lister planter, a counterbalance spring connecting the other end of said last-mentioned lever with the manually operated lever, a pivoted notched arm on the tongue, and a pin on the manually operated lever to engage in any of the notches of said arm whereby the lever is held in any position of adjustment.

GEORGE CAMPBELL.